March 24, 1936. P. L. ALBY 2,034,855
MEANS FOR SUPPLYING AN ADDITIONAL FLUID TO THE
CYLINDER OF AN INTERNAL COMBUSTION ENGINE
Filed April 11, 1934
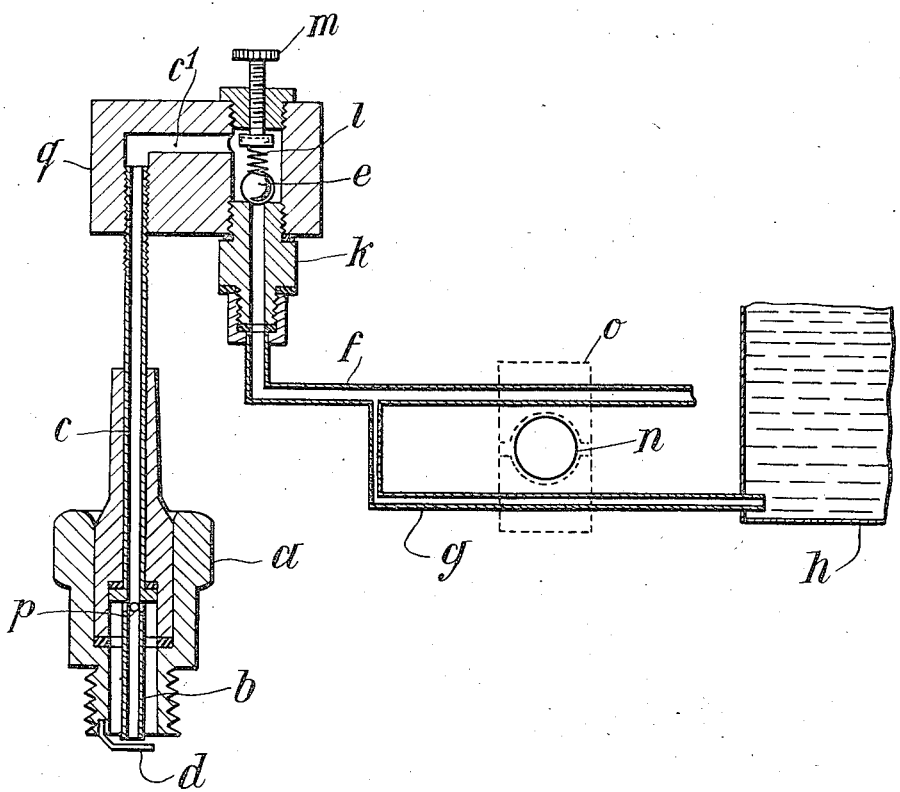
PIERRE LEON ALBY, Inventor Patented Mar. 24, 1936

2,034,855

UNITED STATES PATENT OFFICE 2,034,855

MEANS FOR SUPPLYING AN ADDITIONAL FLUID TO THE CYLINDER OF AN INTERNAL COMBUSTION ENGINE

Pierre Leon Alby, Bordeaux, France

Application April 11, 1934, Serial No. 720,080
In France April 19, 1933

8 Claims. (Cl. 123—75)

This invention relates to a method of and means for supplying an additional fluid to the cylinder of an internal combustion engine.

One object of the present invention is to provide an additional fluid in a cylinder of an internal combustion engine in a favourable condition for explosion.

A further object of the present invention is to provide means for automatically cleaning the electrodes of a sparking plug.

A further object of the invention is to provide a rich combustible mixture to facilitate starting an internal combustion engine.

A further object of the invention is to provide means for economizing fuel.

The invention makes use of the suction produced by the suction stroke of the piston to draw in additional fluid through the sparking plug.

The central electrode of the sparking plug may have a passage extending lengthwise throughout the length of the electrode. This passage may communicate at its outer end with a source of fuel and/or air or other fluid which may be supplied to the said passage through a valve controlled conduit. The valve may be opened by the suction stroke of the piston and the degree of lift may be varied by means of a micrometer screw or like device. The fluid to be passed through the valve controlled conduit may be pre-heated from the engine exhaust.

One form of apparatus made according to the present invention is illustrated by way of example in the accompanying drawing.

The sparking plug $a$ has an inner electrode $b$ bored longitudinally as at $c$ and an outer electrode $d$ adjacent the lower end of the electrode $b$, so that the spark jumps across the inter-electrode space in the usual manner. Towards its lower end the electrode $b$ is provided with a number of radial capillary passages $p$. The electrodes are made of any metal having a good spark generating quality. The upper end of the electrode $b$ is screw threaded into a block $q$ so that the passage $c$ communicates via passage $c^1$ in the block and via a ball valve $e$ with a conduit $f$ which is in communication at its other end with the atmosphere and also intermediate its ends with a conduit $g$. The conduit $g$ projects into a tank $h$ containing liquid fuel. The conduits $f$ and $g$ and the tank $h$ are made of a suitable electrical insulating material, and the arrangement is in the nature of a carburetting system, the tank $h$ corresponding to the fuel reservoir, the conduit $g$ corresponding to the jet and the conduit $f$ corresponding to the induction pipe. The seat for the valve $e$ is formed at the top of one branch of connecting pipe $k$ and the valve is normally held on its seat by a spring $l$, the pressure of which, and consequently the valve stroke, can be regulated by a micrometer screw $m$.

The conduits $f$ and $g$ are disposed respectively above and below an exhaust pipe $n$ which, adjacent the tubes, is surrounded by a block $o$ of heat and electrical insulating material.

The whole apparatus takes the form of an electrically insulated block so that the current from the high tension generator is conducted to the electrode $b$ notwithstanding the possible electrical conductivity of the liquid fuel or fuel mixture.

It will be understood that any form of valve can be employed instead of the ball valve $e$.

In operation liquid fuel from the tank $h$ admixed with air in the conduit $g$ is drawn by the suction stroke of the piston through the valve $e$ and down the central passage $c$ of the electrode $b$, the air and fuel having been pre-heated en route by radiation from the exhaust pipe $n$. When the air-fuel mixture reaches the radial passages $p$ the flow is divided into two streams, the greater part passing out through the radial passages $p$ and the remainder passing down the lower end of the electrode $b$ and impinging directly on the electrode $d$. The two streams reunite on passing into the combustion chamber where owing to its elevated temperature it is in the optima state for mixing without interfering with the supply of the normal explosive mixture through the cylinder and inlet.

The division of the mixture into two streams by means of the passages $p$ permits of cleaning the lower spark end of the electrode both inside and outside.

By means of the micrometer control $m$ the temperature and quantity of the fluid admitted through the passage $c$ may be easily regulated to allow for different conditions produced by hot, cold and intermediate conditions of the sparking plug, so that regulated quantities corresponding to the temperature condition of the sparking plug may be selectively admitted.

The device described may be arranged in unit or block form, one such unit or block being operatively associated with each cylinder.

What I claim and desire to secure by Letters Patent is:—

1. Means for supplying an additional fluid to the cylinder of an internal combustion engine comprising a sparking plug, a central electrode extending through the insulation body of the plug, a valve controlled passage extending lengthwise throughout the said electrode, means for opening the valve by the engine suction so that fluid can pass through the passage into the working cylinder during the suction stroke, in combination with means for dividing the fluid thus admitted into the central passage near the lower end thereof into two streams, which flow respectively inside and outside the central electrode adjacent the lower end thereof.

2. Means for supplying an additional fluid to the cylinder of an internal combustion engine comprising a sparking plug, a central electrode extending through the insulation body of the plug, a valve controlled passage extending lengthwise throughout the said electrode, means for opening the valve by the engine suction so that fluid can pass through the passage into the working cylinder during the suction stroke, radial passages provided in the wall of the central electrode some distance from the bottom thereof adjacent the lower end of the insulation body, the said passages serving to divide the fluid admitted into the central passage into two streams near the lower end of the passage which flow respectively inside and outside the central electrode adjacent the lower end thereof.

3. Means for supplying an additional fluid to the cylinder of an internal combustion engine as claimed in claim 1 further comprising the usual metallic covering to the insulation body of the plug which extends below the insulation body and which terminates in substantially the same horizontal plane as the lower end of the central electrode so that one stream of the fluid sweeps the outer surface of the central electrode and the inner surface of the metallic covering.

4. Means for supplying an additional fluid to the cylinder of an internal combustion engine as claimed in claim 1 further comprising a fluid reservoir in combination with means affording communication between the valve controlled passage and the fluid reservoir wherein the fluid reservoir, the sparking plug and the communication means between the sparking plug and the fluid reservoir are in the form of an electrically insulated block.

5. Means for supplying an additional fluid to the cylinder of an internal combustion engine as claimed in claim 1 further comprising a fluid reservoir in combination with means affording communication between the valve controlled passage and the fluid reservoir wherein the fluid reservoir, the sparking plug and the communication means between the sparking plug and the fluid reservoir are in the form of an electrically insulated block and the lower end of the central electrode is substantially in the same plane as the lower end of the plug, the complementary electrode being disposed at a proper sparking distance therefrom.

6. Means for supplying an additional fluid to the cylinder of an internal combustion engine comprising a sparking plug, a central electrode extending through the insulation body of the plug, a spring-pressed valve opening under fluid pressure and closing under the combined effect of the spring pressure and gravity controlling a passage extending lengthwise through said electrode, means for opening the valve to an adjustable extent by the engine suction so that fluid can pass in adjustable quantities through the passage into the working cylinder during the suction stroke, radial passages provided in the wall of the central electrode some distance from the bottom thereof adjacent the lower end of the insulation body, the said passage serving to divide the fluid thus admitted into the central passage into two streams near the lower end of the passage which flow respectively inside and outside the central electrode adjacent the lower end thereof.

7. Means for supplying an additional fluid to the cylinder of an internal combustion engine comprising a sparking plug, a central electrode extending through the insulation body of the plug, a spring-pressed valve opening under fluid pressure and closing under the combined effect of the spring pressure and gravity controlling a passage extending lengthwise throughout said electrode, means for opening the valve by the engine suction so that fluid can pass through the passage into the working cylinder during the suction stroke, an adjustable stop for varying the pressure of the spring and consequently the degree of lift of the valve, radial passages provided in the wall of the central electrode some distance from the bottom thereof adjacent the lower end of the insulation body, the said passage serving to divide the fluid thus admitted into the central passage near the lower end thereof into two streams which flow respectively inside and outside the central electrode adjacent the lower end thereof.

8. Means for supplying an additional fluid to the cylinder of an internal combustion engine comprising a sparking plug, a central electrode extending through the insulation body of the plug, a spring-pressed valve opening under fluid pressure and closing under the combined effect of the spring pressure and gravity controlling a passage extending lengthwise throughout the said electrode, means for opening the valve by the engine suction so that fluid can pass through the passage into the working cylinder during the suction stroke, a micrometer screw constituting an adjustable stop for varying the pressure of the spring and consequently the degree of lift of the valve, radial passages provided in the wall of the central electrode some distance from the bottom thereof adjacent the lower end of the insulation body, the said passage serving to divide the fluid thus admitted into the central passage near the lower end thereof into two streams which flow respectively inside and outside the central electrode adjacent the lower end thereof.

PIERRE LEON ALBY.